United States Patent
van Deventer et al.

(10) Patent No.: US 9,373,030 B2
(45) Date of Patent: Jun. 21, 2016

(54) AUTOMATED DOCUMENT RECOGNITION, IDENTIFICATION, AND DATA EXTRACTION

(71) Applicant: IDChecker, Inc., San Francisco, CA (US)

(72) Inventors: Jorgen van Deventer, Vlaardingen (NL); Michael Hagen, Los Altos, CA (US); Istvan Mandak, Amsterdam (NL)

(73) Assignee: IDchecker, Inc., San Francisco, CA (US)

( * ) Notice: Subject to any disclaimer, the term of this patent is extended or adjusted under 35 U.S.C. 154(b) by 0 days.

(21) Appl. No.: 14/670,244

(22) Filed: Mar. 26, 2015

(65) Prior Publication Data

US 2015/0199568 A1 Jul. 16, 2015

Related U.S. Application Data

(63) Continuation of application No. 14/468,173, filed on Aug. 25, 2014, now Pat. No. 8,995,774.

(60) Provisional application No. 61/880,062, filed on Sep. 19, 2013, provisional application No. 61/880,060, filed on Sep. 19, 2013.

(51) Int. Cl.
*G06K 9/00* (2006.01)

(52) U.S. Cl.
CPC ........ *G06K 9/00463* (2013.01); *G06K 9/00449* (2013.01)

(58) Field of Classification Search
CPC ...................... G06K 9/00449; G06K 9/00463
See application file for complete search history.

(56) References Cited

U.S. PATENT DOCUMENTS

| 8,831,361 | B2 * | 9/2014 | Pintsov | G06K 9/00483 |
| | | | | 382/209 |
| 8,995,774 | B1 | 3/2015 | van Deventer et al. | |
| 2006/0267737 | A1 | 11/2006 | Colby | |
| 2007/0109101 | A1 | 5/2007 | Colby | |
| 2007/0122004 | A1 | 5/2007 | Brown et al. | |
| 2007/0200679 | A1 | 8/2007 | Colby | |
| 2007/0200680 | A1 | 8/2007 | Colby | |
| 2007/0200681 | A1 | 8/2007 | Colby | |
| 2007/0200684 | A1 | 8/2007 | Colby | |
| 2008/0195858 | A1 | 8/2008 | Nguyen | |
| 2008/0211622 | A1 | 9/2008 | Rindtorff et al. | |

(Continued)

OTHER PUBLICATIONS

"Machine Readable Travel Documents Part 11, Security Mechanishs for MRTDS", Doc 9303, International Civil Aviation Organization, Seventh Edition, 2015.

(Continued)

*Primary Examiner* — Edward Park
(74) *Attorney, Agent, or Firm* — Carr & Ferrell LLP

(57) ABSTRACT

A method for automated document recognition, identification, and data extraction is described herein. The method comprises receiving, by the processor, an image of a document associated with a user. The image is analyzed using optical character recognition to obtain image data, wherein the image data includes text zones. Based on the image data, the image is compared to one or more document templates. Based on the comparison, a document template having the highest degree of coincidence with the image is determined. The text zones of the image are associated with text zones of the document template to determine a type of data in each text zone. The data is structured into a standard format to obtain structured data.

53 Claims, 7 Drawing Sheets

(56) References Cited

U.S. PATENT DOCUMENTS

| | | |
|---|---|---|
| 2008/0238681 A1 | 10/2008 | Rodgers |
| 2008/0279959 A1 | 11/2008 | Holmes |
| 2009/0154778 A1 | 6/2009 | Lei et al. |
| 2010/0066072 A1 | 3/2010 | Paeschke et al. |
| 2010/0150348 A1 | 6/2010 | Fairbanks et al. |
| 2010/0245034 A1 | 9/2010 | D'Oliveiro et al. |
| 2010/0263034 A1 | 10/2010 | Banchelin |
| 2010/0329577 A1 | 12/2010 | Kitai |
| 2011/0068173 A1 | 3/2011 | Powers et al. |
| 2012/0011010 A1 | 1/2012 | Boulanouar |
| 2012/0154246 A1 | 6/2012 | Tietke et al. |
| 2012/0229872 A1 | 9/2012 | Dolev |
| 2012/0230577 A1* | 9/2012 | Calman ............... G06Q 20/042 382/138 |
| 2012/0299709 A1 | 11/2012 | Nishimura |
| 2013/0222119 A1 | 8/2013 | Tietke et al. |
| 2013/0243266 A1 | 9/2013 | Lazzouni |
| 2013/0305059 A1 | 11/2013 | Gormley et al. |
| 2013/0311788 A1 | 11/2013 | Faher et al. |
| 2014/0003717 A1* | 1/2014 | Brito ............... G06K 9/00449 382/170 |
| 2014/0029857 A1 | 1/2014 | Kompalli et al. |
| 2014/0052636 A1* | 2/2014 | Mattes ............... G06Q 20/409 705/44 |
| 2014/0058951 A1 | 2/2014 | Kuppuswamy |
| 2014/0230039 A1 | 8/2014 | Prakash et al. |
| 2015/0078671 A1 | 3/2015 | van Deventer et al. |
| 2015/0347839 A1 | 12/2015 | Hagen |

OTHER PUBLICATIONS

"Machine Readable Travel Documents (MRTDs): History, Interoperability, and Implementation", Version: Release 1, Draft 1.4, International Civil Aviation Organization, Mar. 23, 2007.

Pooters, Ivo, "Keep Out of My Passport: Access Control Mechanisms in E-Passports", Jun. 15, 2008.

Kinneging, Tom A.F., "PKI for Machine Readable Travel Documents offering ICC Read-Only Access", Version 1.1, International Civil Aviation Organization, Oct. 1, 2004.

\* cited by examiner

Recognizing Document

Improving Image Quality

AUTOMATED DOCUMENT RECOGNITION, IDENTIFICATION, AND DATA EXTRACTION

CROSS-REFERENCE TO RELATED APPLICATIONS

The present utility patent application is a continuation of and claims priority benefit of U.S. patent application Ser. No. 14/468,173, filed on Aug. 25, 2014, and issued on Mar. 31, 2015 as U.S. Pat. No. 8,995,774, which is related to and claims priority benefit of the U.S. provisional application No. 61/880,060, filed on Sep. 19, 2013 and U.S. provisional application No. 61/880,062, filed on Sep. 19, 2013 under 35 U.S.C. 119(e). The disclosures of the foregoing provisional applications are incorporated herein by reference for all purposes to the extent that such subject matter is not inconsistent herewith or limiting hereof.

TECHNICAL FIELD

The present disclosure relates generally to data processing and, more specifically, to automated document recognition, identification, and data extraction.

BACKGROUND

Computer technologies can automate many routine processes. Many computerized services involve banking, travel, employment, immigration, social networks, and so forth require users to prove their identity. Users may provide their credentials online, but a more thorough identification involving an identification document may be required. Traditionally, identification documents have been verified visually by a human. Besides being time consuming and prone to errors, visual verification may not be possible in a computerized environment. Thus, speedy and automated verification of identity documents may improve online transactions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for automated document recognition, identification, and data extraction. The system for automated document recognition, identification, and data extraction may comprise a processor and a database communicatively coupled to the processor. The processor may be configured to receive an image of a document associated with a user (e.g., a passport, a driver's license, and so forth). The identification (ID) image may be processed by optical character recognition (OCR) software integrated in the system for automated document recognition, identification, and data extraction to retrieve and extract textual data from the image.

Additionally, the ID image may be compared with one or more document templates stored in a database of the system for automated document recognition, identification, and data extraction. For example, the ID document may be a driver's license, a credit card, and the like. An appropriate document template may be located based on predetermined criteria. The predetermined criteria may include, for example, a degree of coincidence. The type of the ID document is determined according to the document template having the highest similarity to the ID document. In one example, information extracted from the image may be utilized to determine whether one or more criteria have been met for the appropriate document template. The document template may be utilized to map the text data to data groups that may be stored in a standardized format.

A document template may contain information that allows extraction of individual data elements from the text file using an OCR process, which allows associating specific text fragments with data fields according to the determined type of the document. In this way, the document data extracted through OCR may be structured into a standard format.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
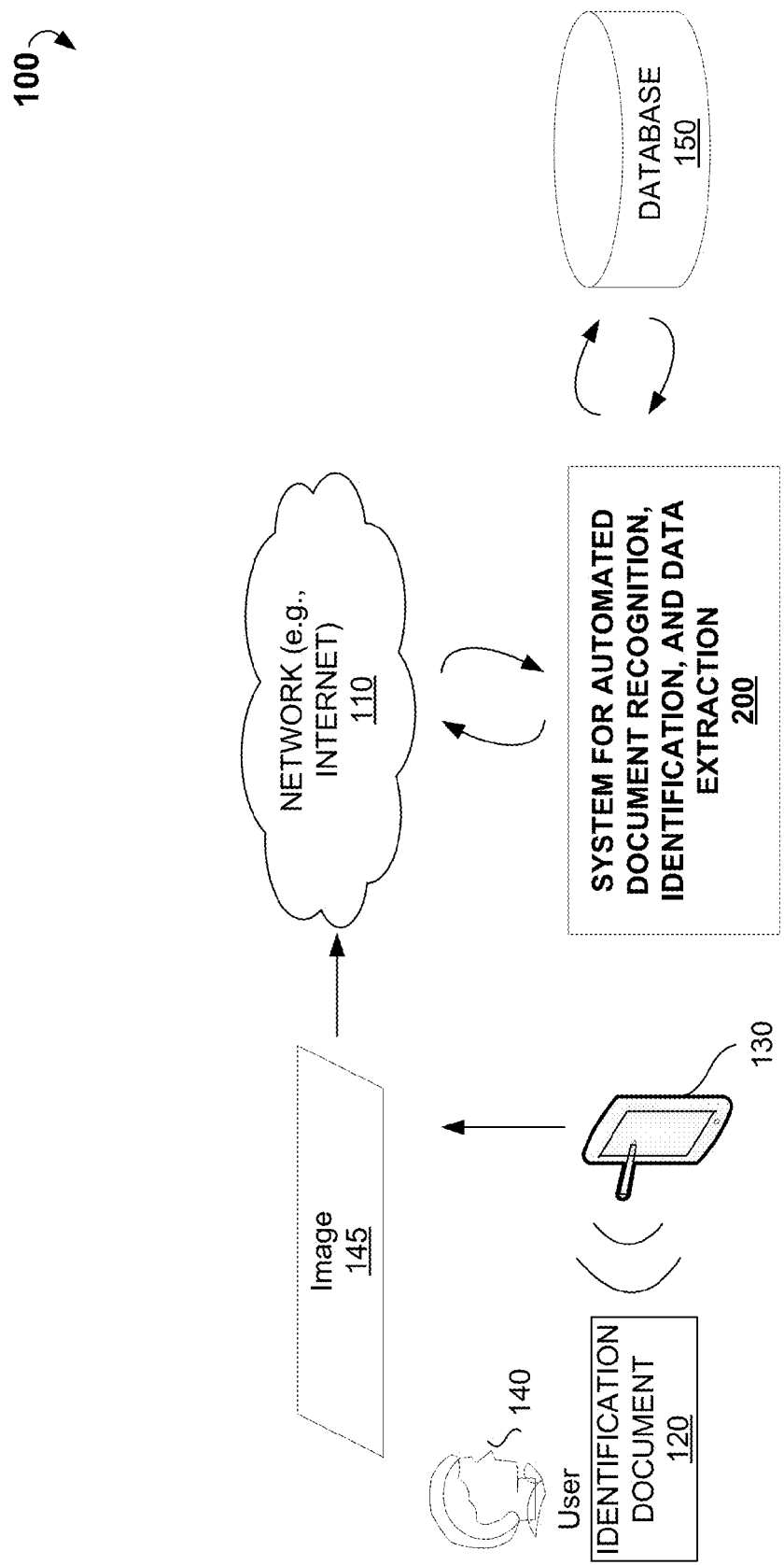
FIG. 1 illustrates an environment within which systems and methods for automated document recognition, identification, and data extraction can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive or computer-readable medium. It should be noted that methods disclosed herein can be implemented by a computer (e.g., a server, desktop computer, tablet computer, laptop computer), game console, handheld gaming device, cellular phone, smart phone, smart television system, and so forth.

Users may be asked to prove identity and provide ID information in various circumstances. Since computers are now incorporated into almost all spheres of our life, the identification information is often provided in a digital form for various purposes, for example, in air travel check-in, hotel registration, social network login, online applications submission, and so forth.

To facilitate the identification process, a user may provide an ID document associated with himself or another user. For this purpose, the user may capture an image of the ID document by using a regular scanner, a photo camera, a smart phone, or the like. An image or a scan associated with the ID document may be uploaded to the system for automated document recognition, identification, and data extraction either via a mobile application, a stand-alone web application, or via a fully integrated service (XML, i-frame).

In some embodiments, the image may be captured by a camera associated with a user (e.g., a phone camera, a tablet personal computer (PC) camera, and so forth). To increase the quality of the image taken by the camera, the user may be prompted to hold the ID document in front of the camera. The video stream from the camera may be transmitted to a system for automated document recognition, identification, and data extraction. The system for automated document recognition, identification, and data extraction may analyze the video stream to detect a shape that can be associated with the ID document. Since in most cases ID documents have a rectangular shape, the detection may involve determining four angles of about 90 degrees each, which form a rectangular shape. When such a rectangular shape is determined in the video stream, the ID document may be identified.

Then, the system for automated document recognition, identification, and data extraction may automatically improve the video stream to improve representation of the identified ID document. For example, the system for automated document recognizing and image taking may focus on the ID document, sharpen the image, remove blurring, adjust brightness and colors, and so forth. In such a way, the quality of the image may be improved, white spots removed, and the like. This may improve recognition of text in the ID document and thus facilitate further data extraction and structuring. A still image of the improved representation of the ID document may be automatically extracted from the video stream and received by the system for automated document recognition, identification, and data extraction.

The system for automated document recognition, identification, and data extraction may analyze the extracted still image and provide various data associated with the ID document (for example, issue date, holder's name, holder's age, and so forth). The system for automated document recognition, identification, and data extraction may automatically improve the image of the recognized ID document by removing blurring, adjusting brightness and colors, and so forth. In such a way, the quality of the image may be improved. Additionally, authenticity characteristics of the identification document may be ascertained. Based on the authentication, results of a biometric verification may be provided.

The system for automated document recognition, identification, and data extraction may use information retrieved from the ID document to populate various online forms. Thus, instead of manually typing personal information that can be normally found in an ID document, the user may just snap a picture of his ID document and send it to the system for automated document recognition, identification, and data extraction. The system will analyze the image, parse the data in the image, and send the parsed data from the ID document back to the user for automatic populating of the fields of the online form. The information may include a first name, last name, address, document number, document expiration data, user gender, age, state, city, zip code, vehicle class, and the like.

The user may be prompted to take a picture of the ID document using a camera and send the image to the system for automated document recognition, identification, and data extraction. The data included in the image of the ID document may be extracted and one or more fields in a form populated with at least a portion of the extracted data. Once the form is completed it may be transmitted to a customer in real time.

In certain example embodiments, the system for automated document recognition, identification, and data extraction may be further configured to process other types of documents including e-mails, faxes, and various electronic files.

FIG. 1 illustrates an environment 100 within which the systems and methods for automated document recognition, identification, and data extraction can be implemented, in accordance with some embodiments. A system 200 for automated document recognition, identification, and data extraction may provide document recognition capabilities via an online portal, special-purpose application, cloud-based application, server-based distributed application, and so forth. When the system 200 is a server-based distributed application, it may include a central component residing on a server and one or more client applications residing on client devices and communicating with the central component via a network 110.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

A user 140 may communicate with the system 200 via a client application available through a client device 130. In still other embodiments, the system 200 may be a cloud-based application with the central component residing on a server and accessible via a web browser on the client device 130.

To verify his identity, the user 140 may send an image 145 associated with an ID document 120 to the system 200 for automated document recognition, identification, and data extraction via a network (e.g., the Internet). For this purpose, the user may utilize, for example, a web application or a mobile application installed on the client device 130. The image may show the ID document 120. The image 145 of the ID document 120 may be taken by a camera associated with the user 140. The camera may, for example, include a phone camera, a notebook camera, a PC camera, and so forth.

Alternatively, the user 140 may capture the image 145 of the ID document 120 by using a regular scanner, a photo camera, a smart phone, or the like. An image or a scan associated with the ID document 120 may be uploaded to the system 200 for automated document recognition, identification, and data extraction either via a mobile application, a stand-alone web application, or via a fully integrated service (XML, i-frame).

In some embodiments, the image may be captured by a camera associated with the user 140 (e.g. a phone camera, a tablet PC camera, and so forth). The system 200 for automated document recognition, identification, and data extraction may assist the user 140 in image taking. The system 200 for automated document recognition, identification, and data extraction may provide instructions to the user 140 via a screen or dynamic of the client device 130. Following the instructions, the user 140 may provide the ID document 120 (associated with the user 140) to be captured by a camera (e.g., web camera) of the client device 130. The ID document 120 may include a driver's license, a government issued ID, a passport, a student ID, and the like.

The captured video stream including the document image may be processed by the system 200 for automated document recognition, identification and data extraction. In many embodiments, processing will be performed in the client device 130 that captures the image of the ID document 120. Alternatively, processing may be performed remotely on a server. For example, the video stream of the ID document 120 may be provided to the central component of the system 200 via the network 110. The system 200 for automated document recognition, identification, and data extraction may recognize the ID document 120 in the video stream by identifying four angles about 90 degrees each. The four angles may form substantially a rectangular shape. Based on the recognizing, the system 200 for automated document recognition, identification, and data extraction may focus on the recognized ID document 120 in the video stream and improve quality of the image by, for example, sharpening the image, removing blurring, and so forth. Then, a still image of the ID document 120 may be extracted from the video stream and transmitted for data extraction to a server as the image 145. Additionally, the image 145 may be stored in a database 150.

The image 145 may be received by a remote server of the system 200 for automated document recognition, identification, and data extraction.

The system 200 for automated document recognition, identification, and data extraction may analyze the image 145 and provide various data associated with the identification document (for example, issue date, holder's name, holder's age, and so forth). The system 200 for automated document recognition, identification, and data extraction may automatically improve the image in the recognized ID document by removing blurring, adjusting brightness and colors, and so forth. In such a way, the quality of the image may be improved. Additionally, authenticity characteristics of the ID document 120 may be ascertained.

In some embodiments, the image 145 of the ID document 120 may be correlated to a plurality of ID templates stored in the database 150 to determine a type of the ID document 120. For example, it may be determined that the image 145 depicts a California driver's license. OCR can be used to extract data from the image 145. The extracted data can be associated with fields of the document based on known locations of such fields for this document type. Thus, identification information can be extracted from the document image 145 and associated with specific fields according to the determined document type. In such a way, the identification information can be structured. The structured information can be transmitted to the client device 130 or to another device, location, or resource and automatically inserted in appropriate fields of an online form.

Figure 2:
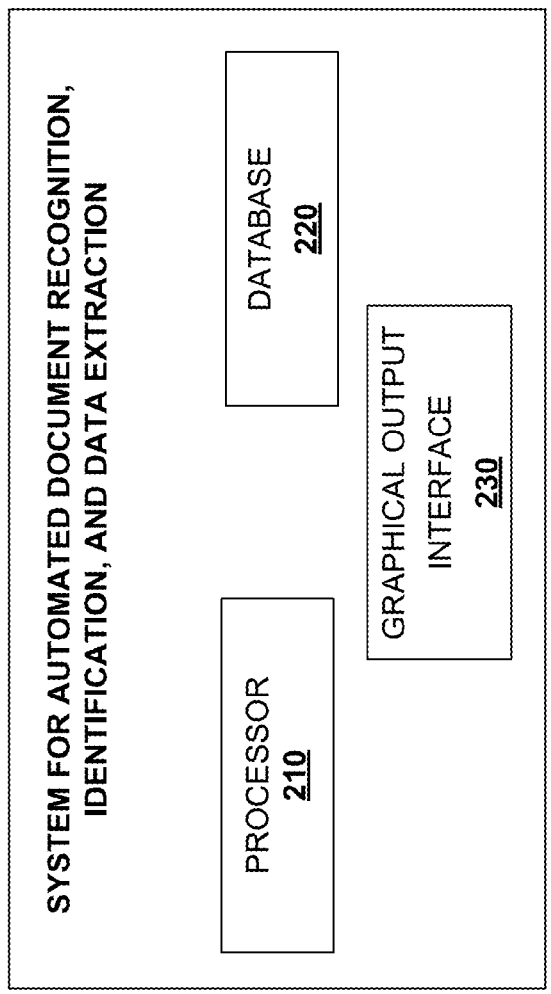
FIG. 2 is a block diagram showing a system for automated document recognition, identification, and data extraction.

FIG. 2 shows a detailed block diagram of the system 200 for automated document recognition, identification and data extraction, in accordance with an example embodiment. The system 200 may include a processor 210, a database 220, and, optionally, a graphical output interface 230. The processor 210 may include a programmable processor, such as a microcontroller, central processing unit (CPU), and so forth. In other embodiments, the processor 210 may include an ASIC or programmable logic array (PLA), such as a field programmable gate array (FPGA), designed to implement the functions performed by the system 200.

The processor 210 may be configured to receive an image associated with an ID document associated with a user. The image may be received by the processor 210 and stored in the database 220. The processor 210 may analyze the image using OCR to detect various zones on the image containing information associated with the ID document and its holder. To determine the type of the document provided, the processor 210 may be configured to match the provided image with one or more document templates stored in the database 220. After finding the template having the highest degree of coincidence with the provided image, the processor 210 may be configured to determine the type of information contained in each zone of the image. The processor 210 may be further configured to structure the retrieved information and upload the information to one or more fields of a fill-out form. In some embodiments, the completed fill-out form is made accessible on system 200.

Additionally, the processor 210 may be configured to receive a video stream associated with the ID document, recognize the document by a shape, improve an image of the document, and extract a still image of the ID document from the video stream. The still image may be stored in the database 220.

Furthermore, the image of the ID document may be analyzed to check authenticity characteristics of the identification document. The processor 210 may provide results of the verification based on the analysis. The processor 210 may comprise or may be in communication with media, for example, computer-readable media, which stores instructions that, when executed by the processor, cause the processor to perform the elements described herein. Additionally, the processor 210 may operate any operating system capable of supporting locally executed applications, client-server based applications, and/or browser or browser-enabled applications.

In some embodiments, the system 200 for automated document recognition, identification, and data extraction may be a part of a biometric verification system. Thus, the system 200 for automated document recognition, identification, and data extraction may recognize the ID document and extract the image of the document, which image may be further used for biometric verification of the user.

Figure 3:
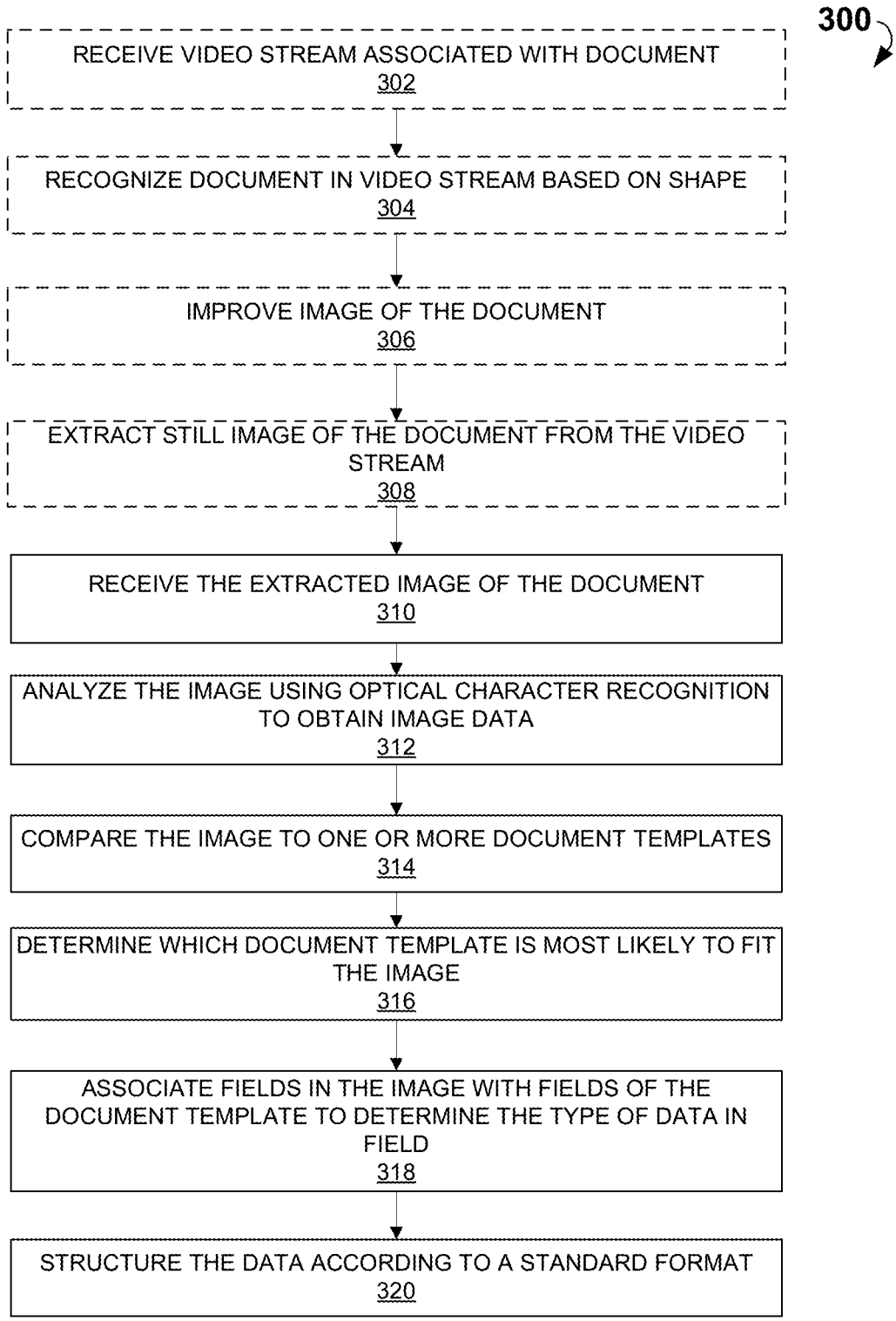
FIG. 3 is a process flow diagram showing a method for automated document recognition, identification, and data extraction.

FIG. 3 is a process flow diagram showing a method 300 for automated document recognition, identification, and data extraction within the environment described with reference to FIG. 1. The method 300 may be performed by a logic that may include hardware (e.g., dedicated logic, programmable logic, and microcode), software (such as software run on a general-purpose computer system or a dedicated machine), or a combination of both. In one exemplary embodiment, the processing logic may reside at a CPU, which may be a programmable module that may manage and connect to other modules in the system as well as implement the instructions according to a set of rules in the form of a program code. Such program code may reside in a memory that also stores example recording sound data of various types and characteristics. Although various elements may be configured to perform some or all of the various operations described herein, fewer or more elements may be provided and still fall within the scope of various embodiments.

As shown in FIG. 3, the method 300 may commence with receiving a video stream associated with a document from a client device at optional operation 302. The document may include a government issued ID, a student ID, an employment ID, a driver's license, a passport, a travel document, and so forth. The received video stream may be captured by a camera associated with the user (for example, a standalone camera, or a camera associated with a user device, such as a smart phone, a PC, a tablet PC, and so forth).

At optional operation 304, the document may be recognized in the video stream received by determining at least four angles. The angles may be substantially 90 degrees each and form a rectangular shape. The received video may be adjusted to focus on the recognized document and otherwise improve an image of the document at optional operation 306. Then, a still image of the document may be extracted from the video stream at optional operation 308.

The extracted image of the document may be received by a server of the system 200 for automated document recognition, identification, and data extraction at operation 310. The received image may include a picture, a scan, and so forth. The image may be captured by a camera associated with the user (for example, a standalone camera, a camera of a user device, such as a smart phone, a PC, a tablet PC, and so forth, scanned by a scanner, or obtained otherwise).

The method 300 may proceed with analyzing, by the processor, the image using OCR to obtain image data at operation 312. The image data may contain text zones with a specific text therein relating to data associated with the ID document. To identify the type of document provided, the image may be compared to one or more document templates pre-stored in the database on the server at operation 314. To perform this comparison, coordinates of text zones on the image of the ID document can be matched to coordinates of text zones of available document templates. In some embodiments, only a partial comparison can be performed. In some cases, the results may state that document identification cannot be performed.

At operation 316, if the comparison is successful, a document template having the highest similarity with the image may be determined.

The method 300 may further proceed with associating the text fields of the image with text fields of the best-matching document template to determine the type of data in each text field at operation 318. For example, it may be determined that the text field in a right upper corner contains a first name of the ID document holder, the text field in the right bottom corner contains a document number, and so forth. Based on the associating, the data may be structured according to a standard format at operation 320. The structured data may be further used to populate the field of a fill-out form.

Figure 4:
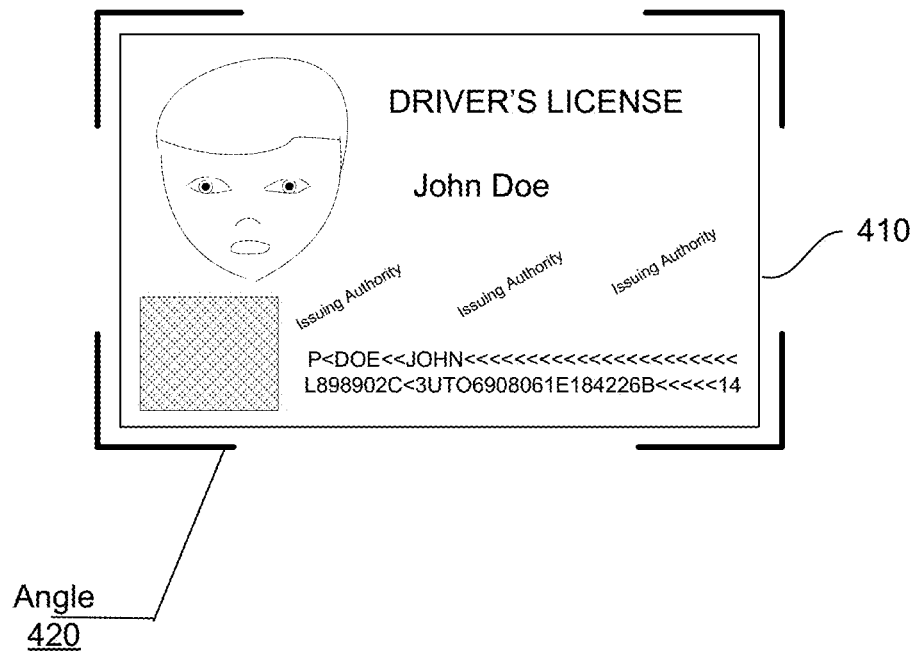
FIG. 4 illustrates example recognizing of a document.

FIG. 4 illustrates example recognizing 400 of a document 410 in a video stream. The video stream may be analyzed to detect a shape associated with the document. Since many documents have a rectangular shape, the document 410 may be recognized by its corners forming a rectangular. For example, the document 410 may be identified by four angles 420 of 90 degrees each. The four angles 420 form a substantially rectangular shape.

When the document 410 is recognized, an image associated with the document 410 may be improved in various ways. Improving an image is illustrated by FIG. 5.

Figure 5:
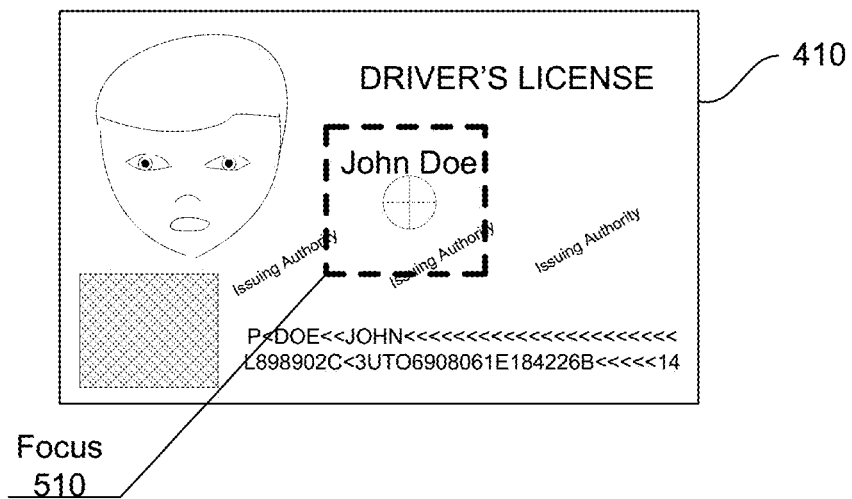
FIG. 5 illustrates example focusing on an image of the document.

FIG. 5 shows an example of improving quality 500 of an image of the document 410 in the video stream, in accordance with an example embodiment. The image improving may include focusing (as shown by focus 510) on the identification document 410, adjusting colors, adjusting brightness, removing blurring, and so forth. In this manner, further data extracting from the document may be facilitated. For example, the system for automated document recognition, identification, and data extraction may use OCR to extract data shown in the document. By improving the image quality, the system may eliminate errors possible with OCR, filter out visual noise, and so forth.

The system for automated document recognition, identification, and data extraction may extract the improved image of the document 410 from the video stream and store it to the database.

In some embodiments, the system for automated document recognition, identification, and data extraction may further determine type of the document in the stored image and extract the document data.

To determine the document type, the layout of the document 410 may be compared to layouts of document templates stored in the database. The comparison may be based on location of data fields, photos, holograms, and so forth. Additionally, fonts used in the document, country indication, and other specifics may be applied as filters to narrow down the number of templates that are matches to the document. The templates may provide reference data, such as location of specific information. Reference data facilitates extracting information from the document 410 and helps in structuring the extracted information.

In some embodiments, the data extracted from the document 410 is used to fill in web forms or blanks where personal information of the document holder should be specified.

Figure 6:
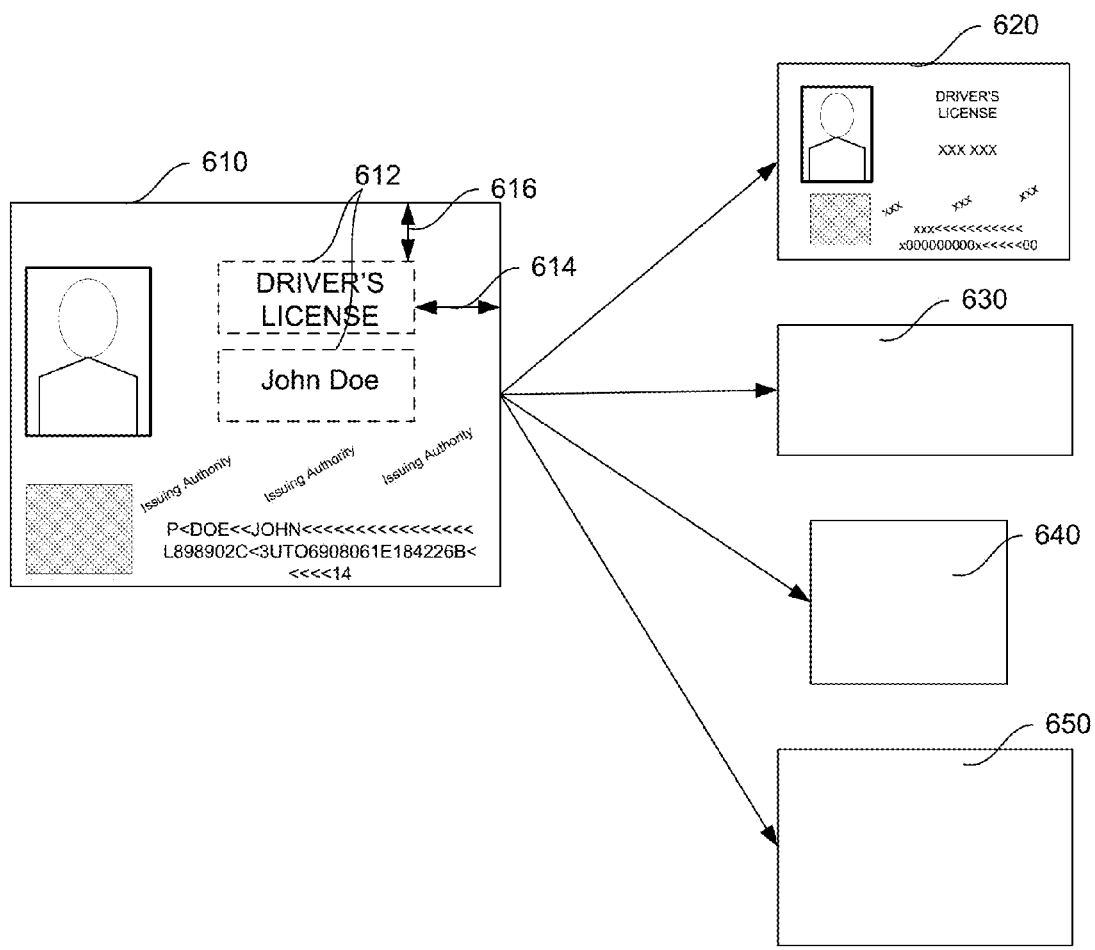
FIG. 6 illustrates example comparing of an identification document to document templates.

FIG. 6 illustrates comparing 600 an ID document 610 to a number of document templates 620, 630, 640, 650, in accordance with some embodiments. A user may take a picture of ID document 610 and upload a digital image of the ID document 610 to the system. The image received by the system for automated document recognition, identification, and data extraction may be subjected to OCR. The ID document 610 may include a number of information fields containing different types of data associated with the ID document and its holder, such as first name, last name, and the like. The information fields may be organized according to one of a plurality of known formats presented by document templates stored in a database of the system for automated document recognition, identification, and data extraction. The image may be segmented into a number of zones 612 each relating to a separate field. The distance between the zones and the borders of each zone may be defined by coordinates (x, y) 614, 616. These coordinates 614, 616 may be used to compare the image to one or more document templates. The document templates can be segmented into a number of zones with a predetermined set of coordinates and distances between the zones. The coordinates of the image and the document templates can be matched and the best matching document template can be determined. When the document template is determined, the zones of the image can be associated with the zones of the template to determine the types of data contained in each zone of the image. The data may then be structured according to the identified format.

Figure 7:
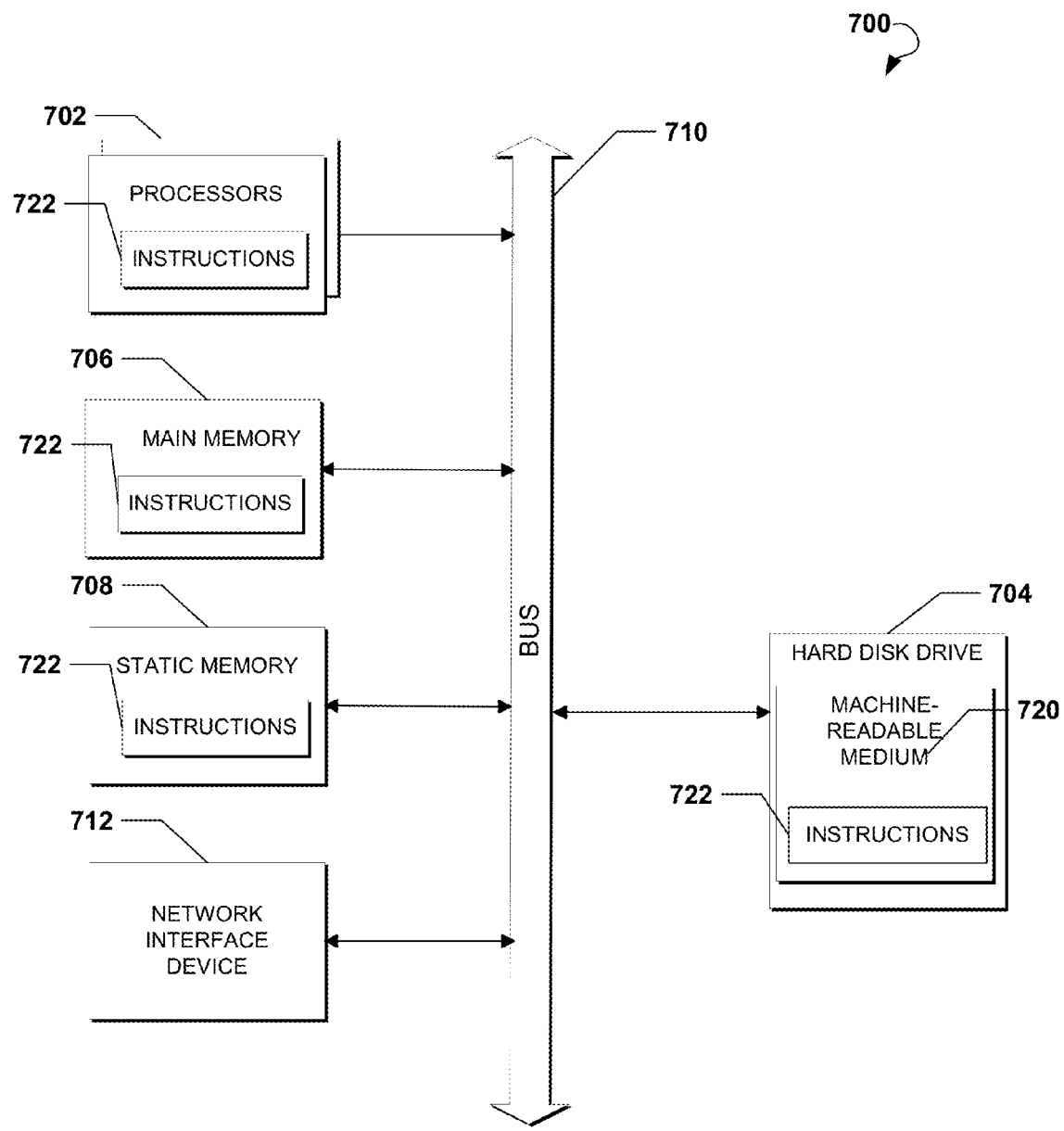
FIG. 7 shows a diagrammatic representation of a computing device for a machine in the exemplary electronic form of a computer system, within which a set of instructions for causing the machine to perform any one or more of the methodologies discussed herein can be executed.

FIG. 7 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702, a hard disk drive 704, a main memory 706, and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or within the processors 702 during execution thereof by the computer system 700. The main memory 706 and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, computer-implemented methods and systems for automated document recognition, identification, and data extraction are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system comprising:
   a processor; and
   a memory communicatively coupled to the processor, the memory storing instructions executable to perform a method, the method including:
      receiving an image of an identity document, the image being produced using a video stream;
      recognizing a plurality of text elements in the image using optical character recognition;
      finding a document template of a plurality of templates having a high degree of coincidence with the image using a substantially rectangular shape of the image overall, at least one of the text elements, and a respective location in the image for the at least one text element;
      associating each of the text elements with a respective field of the document template using the text elements and a respective location in the image for each of the text elements;
      placing at least one of the associated text elements in a respective field of a form, the respective field of the form corresponding to the respective associated field of the document template;
      making the completed form accessible on the system;
      placing at least one of the associated text elements in a respective field of a second form, the respective field of the second form corresponding to the respective associated field of the document template; and
      making the second completed form accessible on the system.

2. The system of claim 1 wherein the method further includes:
   ascertaining an authenticity characteristic in the image; and
   providing the authenticity characteristic for biometric verification.

3. The system of claim 1 wherein the method further includes:
   storing the completed form in a data store.

4. The system of claim 1 wherein the identity document is at least one of: a government issued identity document, a student identity document, an employment identity document, a driver's license, a passport, and a travel document.

5. The system of claim 1 wherein the method further includes:
 improving the received image by removing blurring, adjusting brightness, and adjusting colors.

6. The system of claim 1 wherein the plurality of text elements includes at least one of: a first name, last name, address, document number, document expiration date, gender, age, state, city, zip code, and vehicle class.

7. The system of claim 1 wherein each of the plurality of templates is associated with at least one of: a government issued identity document, a student identity document, an employment identity document, a driver's license, a passport, and a travel document.

8. The system of claim 1 wherein the respective location in the image for each of the text elements includes Cartesian coordinates where the origin lies at a corner of the image.

9. The system of claim 8 wherein the respective location in the image for each of the text elements further includes a distance from another location in the image for another text element and a distance from an edge of the image, the distance determined using respective Cartesian coordinates of each of the text elements, the another text element, and the edge of the image.

10. A computer-implemented method comprising:
 receiving an image of an identity document, the image being produced using a video stream;
 recognizing a plurality of text in the image using optical character recognition;
 finding a document template of a plurality of templates having a high degree of coincidence with the image using a substantially rectangular shape of the image overall, at least one of the text elements, and a respective location in the image for the at least one text element;
 associating each of the text elements with a respective field of the document template using the text elements and a respective location in the image for each of the text elements;
 placing at least one of the associated text elements in a respective field of a form, the respective field of the form corresponding to the respective associated field of the document template;
 making the completed form accessible on a system;
 placing at least one of the associated text elements in a respective field of a second form, the respective field of the second form corresponding to the respective associated field of the document template; and
 making the second completed form accessible on a system.

11. The method of claim 10 further comprising:
 ascertaining an authenticity characteristic in the image; and
 providing the authenticity characteristic for biometric verification.

12. The method of claim 10 further comprising:
 storing the completed form in a data store.

13. The method of claim 10 wherein the identity document is at least one of: a government issued identity document, a student identity document, an employment identity document, a driver's license, a passport, and a travel document.

14. The method of claim 10 further comprising:
 improving the received image by removing blurring, adjusting brightness, and adjusting colors.

15. The method of claim 10 wherein the plurality of text elements includes at least one of: a first name, last name, address, document number, document expiration date, gender, age, state, city, zip code, and vehicle class.

16. The method of claim 10 wherein each of the plurality of templates is associated with at least one of: a government issued identity document, a student identity document, an employment identity document, a driver's license, a passport, and a travel document.

17. The method of claim 10 wherein the respective location in the image for each of the text elements includes Cartesian coordinates where the origin lies at a corner of the image.

18. The method of claim 17 wherein the respective location in the image for each of the text elements further includes a distance from another location in the image for another text element and a distance from an edge of the image, the distance determined using respective Cartesian coordinates of each of the text elements, the another text element, and the edge of the image.

19. A non-transitory computer-readable medium having a program embodied thereon, the program executable by a processor to perform a method, the method comprising:
 receiving an image of an identity document, the image being produced using a video stream;
 recognizing a plurality of text in the image using optical character recognition;
 finding a document template of a plurality of templates having a high degree of coincidence with the image using a substantially rectangular shape of the image overall, at least one of the text elements, and a respective location in the image for the at least one text element;
 associating each of the text elements with a respective field of the document template using the text elements and a respective location in the image for each of the text elements;
 placing at least one of the associated text elements in a respective field of a form, the respective field of the form corresponding to the respective associated field of the document template;
 making the completed form accessible on a system;
 placing at least one of the associated text elements in a respective field of a second form, the respective field of the second form corresponding to the respective associated field of the document template; and
 making the second completed form accessible on a system.

20. A system comprising:
 a processor; and
 a memory communicatively coupled to the processor, the memory storing instructions executable to perform a method, the method including:
 receiving an image of an identity document, the image being produced using a video stream;
 improving the image, wherein the improving includes removing blurring, adjusting brightness, and adjusting colors;
 recognizing a plurality of text elements in the image using optical character recognition;
 finding a document template of a plurality of templates having a high degree of coincidence with the image using a substantially rectangular shape of the image overall, at least one of the text elements, and a respective location in the image for the at least one text element;
 associating each of the text elements with a respective field of the document template using the text elements and a respective location in the image for each of the text elements;
 placing at least one of the associated text elements in a respective field of a form, the respective field of the form corresponding to the respective associated field of the document template; and making the completed form accessible on the system.

21. The system of claim 20 wherein the method further includes:

ascertaining an authenticity characteristic in the image; and providing the authenticity characteristic for biometric verification.

22. The system of claim 20 wherein the method further includes:

storing the completed form in a data store.

23. The system of claim 20 wherein the method further includes:

placing at least one of the associated text elements in a respective field of a second form, the respective field of the second form corresponding to the respective associated field of the document template; and making the second completed form accessible on the system.

24. The system of claim 20 wherein the identity document is at least one of: a government issued identity document, a student identity document, an employment identity document, a driver's license, a passport, and a travel document.

25. The system of claim 20 wherein the plurality of text elements includes at least one of: a first name, last name, address, document number, document expiration date, gender, age, state, city, zip code, and vehicle class.

26. The system of claim 20 wherein each of the plurality of templates is associated with at least one of: a government issued identity document, a student identity document, an employment identity document, a driver's license, a passport, and a travel document.

27. The system of claim 20 wherein the respective location in the image for each of the text elements includes Cartesian coordinates where the origin lies at a corner of the image.

28. The system of claim 27 wherein the respective location in the image for each of the text elements further includes a distance from another location in the image for another text element and a distance from an edge of the image, the distance determined using respective Cartesian coordinates of each of the text elements, the another text element, and the edge of the image.

29. A system comprising:

a processor; and a memory communicatively coupled to the processor, the memory storing instructions executable to perform a method, the method including:

receiving an image of an identity document, the image being produced using a video stream;

recognizing a plurality of text elements in the image using optical character recognition;

finding a document template of a plurality of templates having a high degree of coincidence with the image using a substantially rectangular shape of the image overall, at least one of the text elements, and a respective location in the image for the at least one text element, wherein the respective location in the image for each of the text elements includes Cartesian coordinates where the origin lies at a corner of the image and a distance from another location in the image for another text element and a distance from an edge of the image, the distance determined using respective Cartesian coordinates of each of the text elements, the another text element, and the edge of the image;

associating each of the text elements with a respective field of the document template using the text elements and a respective location in the image for each of the text elements;

placing at least one of the associated text elements in a respective field of a form, the respective field of the form corresponding to the respective associated field of the document template; and making the completed form accessible on the system.

30. The system of claim 29 wherein the method further includes:

ascertaining an authenticity characteristic in the image; and providing the authenticity characteristic for biometric verification.

31. The system of claim 29 wherein the method further includes:

storing the completed form in a data store.

32. The system of claim 29 wherein the method further includes:

placing at least one of the associated text elements in a respective field of a second form, the respective field of the second form corresponding to the respective associated field of the document template; and making the second completed form accessible on the system.

33. The system of claim 29 wherein the identity document is at least one of: a government issued identity document, a student identity document, an employment identity document, a driver's license, a passport, and a travel document.

34. The system of claim 29 wherein the method further includes:

improving the received image by removing blurring, adjusting brightness, and adjusting colors.

35. The system of claim 29 wherein the plurality of text elements includes at least one of: a first name, last name, address, document number, document expiration date, gender, age, state, city, zip code, and vehicle class.

36. The system of claim 29 wherein each of the plurality of templates is associated with at least one of: a government issued identity document, a student identity document, an employment identity document, a driver's license, a passport, and a travel document.

37. A computer-implemented method comprising:

receiving an image of an identity document, the image being produced using a video stream;

improving the image, wherein the improving includes removing blurring, adjusting brightness, and adjusting colors;

recognizing a plurality of text elements in the image using optical character recognition;

finding a document template of a plurality of templates having a high degree of coincidence with the image using a substantially rectangular shape of the image overall, at least one of the text elements, and a respective location in the image for the at least one text element;

associating each of the text elements with a respective field of the document template using the text elements and a respective location in the image for each of the text elements;

placing at least one of the associated text elements in a respective field of a form, the respective field of the form corresponding to the respective associated field of the document template; and making the completed form accessible on a system.

38. The method of claim 37 further comprising:
ascertaining an authenticity characteristic in the image; and
providing the authenticity characteristic for biometric verification.

39. The method of claim 37 further comprising:
storing the completed form in a data store.

40. The method of claim 37 further comprising:
placing at least one of the associated text elements in a respective field of a second form, the respective field of the second form corresponding to the respective associated field of the document template; and
making the second completed form accessible on a system.

41. The method of claim 37 wherein the identity document is at least one of: a government issued identity document, a student identity document, an employment identity document, a driver's license, a passport, and a travel document.

42. The method of claim 37 wherein the plurality of text elements includes at least one of: a first name, last name, address, document number, document expiration date, gender, age, state, city, zip code, and vehicle class.

43. The method of claim 37 wherein each of the plurality of templates is associated with at least one of: a government issued identity document, a student identity document, an employment identity document, a driver's license, a passport, and a travel document.

44. The method of claim 37 wherein the respective location in the image for each of the text elements includes Cartesian coordinates where the origin lies at a corner of the image.

45. The method of claim 44 wherein the respective location in the image for each of the text elements further includes a distance from another location in the image for another text element and a distance from an edge of the image, the distance determined using respective Cartesian coordinates of each of the text elements, the another text element, and the edge of the image.

46. A computer-implemented method comprising:
receiving an image of an identity document, the image being produced using a video stream;
recognizing a plurality of text elements in the image using optical character recognition;
finding a document template of a plurality of templates having a high degree of coincidence with the image using a substantially rectangular shape of the image overall, at least one of the text elements, and a respective location in the image for the at least one text element, wherein the respective location in the image for each of the text elements includes Cartesian coordinates where the origin lies at a corner of the image and a distance from another location in the image for another text element and a distance from an edge of the image, the distance determined using respective Cartesian coordinates of each of the text elements, the another text element, and the edge of the image;
associating each of the text elements with a respective field of the document template using the text elements and a respective location in the image for each of the text elements;
placing at least one of the associated text elements in a respective field of a form, the respective field of the form corresponding to the respective associated field of the document template; and
making the completed form accessible on a system.

47. The method of claim 46 further comprising:
ascertaining an authenticity characteristic in the image; and
providing the authenticity characteristic for biometric verification.

48. The method of claim 46 further comprising:
storing the completed form in a data store.

49. The method of claim 46 further comprising:
placing at least one of the associated text elements in a respective field of a second form, the respective field of the second form corresponding to the respective associated field of the document template; and
making the second completed form accessible on a system.

50. The method of claim 46 wherein the identity document is at least one of: a government issued identity document, a student identity document, an employment identity document, a driver's license, a passport, and a travel document.

51. The method of claim 46 further comprising:
improving the received image by removing blurring, adjusting brightness, and adjusting colors.

52. The method of claim 46 wherein the plurality of text elements includes at least one of: a first name, last name, address, document number, document expiration date, gender, age, state, city, zip code, and vehicle class.

53. The method of claim 46 wherein each of the plurality of templates is associated with at least one of: a government issued identity document, a student identity document, an employment identity document, a driver's license, a passport, and a travel document.

* * * * *